(12) United States Patent
Kienzle et al.

(10) Patent No.: US 7,039,189 B1
(45) Date of Patent: May 2, 2006

(54) STREAM CONTINUITY ENFORCEMENT

(75) Inventors: Martin Kienzle, Briarcliff Manor, NY (US); Ray E. Rose, Purdys, NY (US); Olivier Verscheure, Long Island City, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/528,456

(22) Filed: Mar. 17, 2000

(51) Int. Cl.
*H04K 1/00* (2006.01)

(52) U.S. Cl. .................. 380/239; 380/28; 380/210; 380/217; 713/168; 713/193

(58) Field of Classification Search ............ 380/239, 380/28, 210, 217; 713/168, 193
See application file for complete search history.

(56) References Cited

U.S. PATENT DOCUMENTS

| | | | |
|---|---|---|---|
| 4,535,355 A * | 8/1985 | Arn et al. ............. | 380/212 |
| 5,548,648 A * | 8/1996 | Yorke-Smith ........... | 713/193 |
| 5,613,004 A * | 3/1997 | Cooperman et al. ...... | 380/28 |
| 5,621,799 A * | 4/1997 | Katta et al. ............. | 380/217 |
| 5,872,846 A * | 2/1999 | Ichikawa ............... | 380/282 |
| 5,889,860 A | 3/1999 | Eller et al. | |
| 6,011,849 A * | 1/2000 | Orrin ................... | 380/42 |
| 2001/0036271 A1* | 11/2001 | Javed .................. | 380/217 |
| 2002/0003881 A1* | 1/2002 | Reitmeier et al. ....... | 380/210 |
| 2002/0152378 A1* | 10/2002 | Wallace et al. ......... | 713/168 |

FOREIGN PATENT DOCUMENTS

| | | |
|---|---|---|
| JP | 10-164550 | 6/1998 |
| JP | 2000-59753 | 2/2000 |

OTHER PUBLICATIONS

Mintzer et al., "Opportunities for Watermarking Standards," Communications of the ACM, vol. 41, No. 7, pp. 57-64, Jul. 1998.
Berghel, "Watermarking Cyberspace," Communications of the ACM, vol. 40, No. 11, pp. 19-24, Nov. 1997.
Swanson et al., "Multimedia Data-Embedding and Watermarking Technologies," Processing of the IEEE, vol. 86, No. 6, pp. 1064-1087, Jun. 1998.

\* cited by examiner

*Primary Examiner*—Christopher Revek
*Assistant Examiner*—Taghi T. Arani
(74) *Attorney, Agent, or Firm*—F.Chau & Associates,LLC

(57) ABSTRACT

A system for enforcing data stream continuity, in accordance with the present invention, includes a server coupled to a transmission link for providing a data stream to at least one client over the transmission link. The data stream is segmented into units. The server includes a scrambler for encrypting at least one first unit using an encryption key, and a steganographic unit for embedding the encryption key into at least one second unit for the data stream such that steganographic information is needed by the client to determine the encryption key and decipher the data stream.

29 Claims, 5 Drawing Sheets

STREAM CONTINUITY ENFORCEMENT

BACKGROUND OF THE INVENTION

1. Field of the Invention

The present invention relates to digital multimedia stream distribution, and more particularly to a system and method to protect digital multimedia streams from unauthorized editing. The present invention may be employed for a plurality of different applications and may be particularly useful with regard to the commercial distribution of copyrighted works or other proprietary subject matter over either a public network or a physical storage medium, for example, DVD.

2. Description of the Related Art

With the advent of public computer networks, and the Internet, authors of digital media have an inexpensive means to distribute their works to a growing and massive audience. Consumers thus benefit from improved access to information and greater convenience. While artists and businesses benefit from distribution channels with enormous potential to reach a wide and varying client base.

Despite this potential, content providers have been reluctant to embrace this market. One hurdle to be overcome is a fundamental problem in the digital world, as opposed to the analog world. This fundamental problem is that an unlimited number of perfect editing operations can be made on any piece of digital content. A perfect edition means that no degradation is introduced by the editing operation. For example, one can easily get rid of some or all the commercials intentionally embedded in a movie. The resulting "commercial-free" movie can be distributed without quality difference from the unedited one.

The research area of "copyright protection" brings adequate solutions to this problem. Two typical technologies for copyright protection include "cryptography" and "steganography."

"Cryptography" is a field covering numerous techniques for scrambling information conveying messages so that when the message is conveyed between the sender and the receiver, a malicious party who intercepts this message cannot read it, edit it nor extract useful information from it. Once the content has been scrambled it cannot be used until it is unscrambled. Unscrambling requires the possession of a special key.

"Steganography" is a field covering numerous methods for hiding an informational message within some other medium in such a way that a malicious party who intercepts the medium carrying the hidden message does not know it contains this hidden message, for example a hidden watermark. Assuming the malicious party knows that the medium contains a hidden message, steganography makes it extremely difficult to extract it for further reading or editing.

Although these technologies provide protection from copying documents, a need exists to prevent the editing of documents by the addition or removal of portions of the document.

SUMMARY OF THE INVENTION

A system for enforcing data stream continuity, in accordance with the present invention, includes a server coupled to a transmission link for providing a data stream to at least one client over the transmission link. The data stream is segmented into units. The server includes a scrambler for encrypting at least one first unit using an encryption, and a steganographic unit for embedding the encryption key into at least one second unit for the data stream such that steganographic information is needed by the client to determine the encryption key and decipher the data stream.

In alternate embodiments, the steganographic unit preferably employs a steganographic masking algorithm. The data stream may include a transmission order which alternates between first units and second units. The steganographic unit preferably encrypts the at least one second unit. The at least one first unit and the at least one second unit may be encrypted and each may carry a portion of the encryption key. The transmission link may include the Internet. At least one of the client and the server may include a memory storage device.

Another system for enforcing data stream continuity includes a client system coupled to a transmission link for receiving a data stream from at least one server over the transmission link. The data stream is segmented into units. The client system includes a key extractor for extracting an encryption key steganographically hidden in at least one first unit in the data stream received from the server such that steganographic information is needed by the client to determine the encryption key. A descrambler descrambles at least one second unit which was encrypted in accordance with the encryption key before transmission from the server. A decoder is coupled to the key extractor and the descrambler for reassembling the data stream such that all of the units of the data stream are needed to decipher the data stream.

In alternate embodiments, the data stream may include a transmission order which alternates between first units and second units. The encryption key may also be steganographically hidden in the at least one second unit. The at least one first unit and the at least one second unit may be encrypted and each may carry a portion of the encryption key. The transmission link may include the Internet. At least one of the client and the server may include a memory storage device.

A method for enforcing data stream continuity, in accordance with the present invention, includes the steps of providing data to be transmitted over a link, segmenting the data into units for a data stream to be transferred over the link, scrambling at least one first unit by encrypting the at least one first unit using an encryption key, steganographically embedding the encryption key into at least one second unit for the data stream such that steganographic information is needed by a client to determine the encryption key and decipher the data stream, extracting the encryption key steganographically embedded in the at least one second unit in the data stream, descrambling at least one first unit which was encrypted in accordance with the encryption key and reassembling the data stream at the client such that all of the units of the data stream are needed to decipher the data stream.

Another method for enforcing data stream continuity, in accordance with the present invention includes providing data to be transmitted over a link, segmenting the data into units for a data stream to be transferred over the link, scrambling at least one first unit by encrypting the at least one first unit using an encryption key and steganographically embedding the encryption key into at least one second unit for the data stream such that steganographic information is needed by a client to determine the encryption key and decipher the data stream.

Yet, another method for enforcing data stream continuity, in accordance with the present invention, includes providing data segmented into units for a data stream transferred over the link, the units including at least one first unit and at least one second unit, extracting an encryption key steganographically embedded in the at least one second unit in the data stream, descrambling the at least one first unit which was encrypted in accordance with the encryption key and reassembling the data stream at the client such that all of the units of the data stream are needed to decipher the data stream.

In other methods, the data stream may include a transmission order which alternates between first units and second units. The step of steganographically embedding may include the step of steganographically embedding portions of the encryption key in the at least one first unit. The at least one first unit and the at least one second unit may be encrypted and may each carry a portion of the encryption key. The link may include the Internet. At least one of the client and the server may include a memory storage device. The methods and/or method steps may be implemented by a program storage device readable by machine, tangibly embodying a program of instructions executable by the machine to perform the method steps for enforcing data stream continuity in accordance with the invention.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention includes a system and method for protecting a digital multimedia stream against unauthorized editing. The present invention employs cryptographic and steganographic methods. By the present invention, a digital multimedia stream is divided up into units. The system and method enforce the continuity of two successive units i and i+1. The unit i includes an encryption key embedded using a steganographic function. The unit i+1 is encrypted using the key hidden in unit i. The system and method make it extremely difficult to edit the digital stream if the steganographic function is not possessed by the unauthorized person.

A digital multimedia distribution system of the present invention is useful in a variety of applications where it is desired to protect multimedia streams from unauthorized editing. Unauthorized editing includes, among many others, FBI warning message removal, advertising clips suppression, sound bytes removal, altering video segments or any other removal or addition of data to a data stream or stored media. The present invention has very broad applications and may be employed form any data stream or stored data. In one implementation, the present invention is employed to distribute digital music, video, text documents or any other data stream across a network or between a server and a client. The network may include a private network or a public network, such as, for example, the Internet. The server may include a VCR, a computer, a modem, a video player, a compact disc player, a wireless transmission device, a tape player or other transmission device or memory storage device. The client may include a VCR, a computer, a modem, a video player, a compact disc player, a wireless receiver device, a tape player or other receiver device or memory storage device.

It should be understood that the elements shown in FIGS. 1–4 may be implemented in various forms of hardware, software or combinations thereof. Preferably, these elements are implemented in software on one or more appropriately programmed general purpose digital computers having a processor and memory and input/output interfaces. Further, clients and servers (or client and server systems), as described herein, may apply to software applications, hardware devices or a combination thereof. Clients and servers may be resident on the same device or on a different devices.

Figure 1:
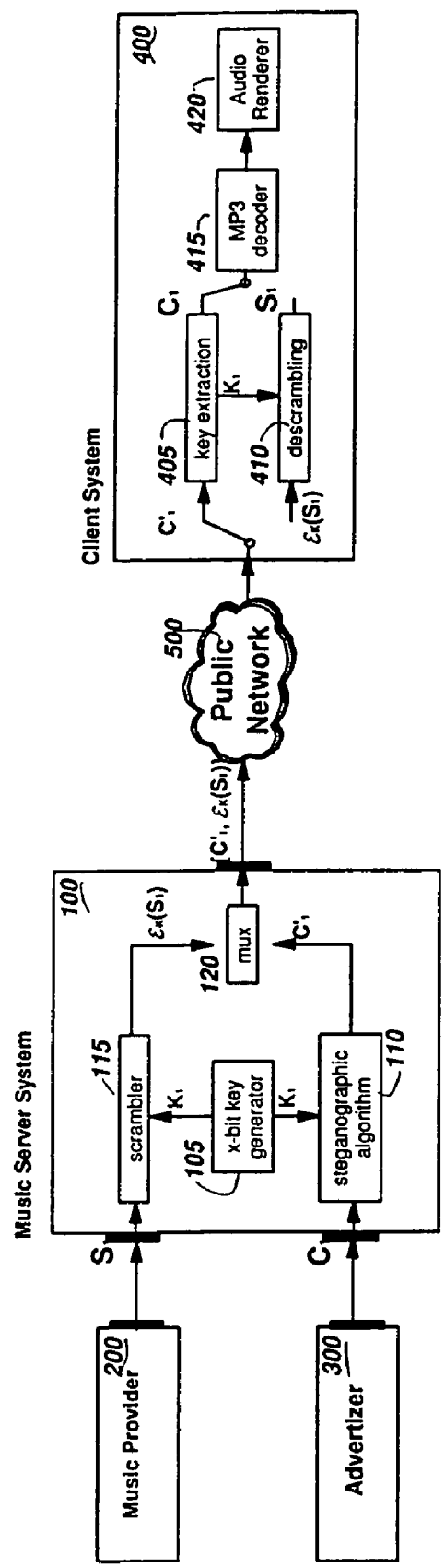
FIG. 1 is a block/flow diagram illustrating a system and method for protecting a music data stream from unauthorized editing in accordance with the present invention.

Referring now to the drawings in which like numerals represent the same or similar elements and initially to FIG. 1, an illustrative system/method for employing one embodiment of the present invention is shown.

The present invention will now be described illustratively in terms of an example including a music data stream. The present invention should not be construed as limited by this example. FIG. 1 illustrates a digital music distribution system 10. The system 10 includes a data provider 200, such as, for example, a music provider, an advertiser 300 or alternate source of data, a server system 100, a network 500, such as a public network (e.g., the Internet) and a client 400. It is to be understood that multiple clients or servers may be employed in system 10. The music provider 200 and the advertiser 300 are shown to illustrate how multiple sources may include data into a data stream; however a single data source, such as a storage medium or a data source may be employed, as well as a plurality of data sources.

In the example, the music provider 200 and the advertiser 300 provide the music server system 100 with, for example, MP3-encoded music and short commercial audio clips, respectively. Upon request, the music server system 100 provides the client 400 with an editing-proof audio stream $\{C'_1, E_{K1}(S_1)\}$. The data stream, $\{C'_1, E_{K1}(S_1)\}$, is generated by segmenting the data stream into units.

Within the music server 100, an x-bit key generator 105 generates a key $K_1$. A steganographic function or algorithm 110 hides the randomly-generated key $K_1$ into a short commercial audio clip, $C_1$, provided by the advertiser 200. This generates $C'_1$. Then, a scrambler 115 encrypts an MP3-encoded music clip, $S_1$, provided by the music provider 300 using key $K_1$. This generates $E_{K1}(S_1)$. The music server system 100 distributes the digital stream $\{C'_1, E_{K1}(S_1)\}$ resulting from the concatenation of the short commercial audio clip including the key $K_1$, $C'_1$, and the scrambled digital music clip, $E_{K1}(S_1)$.

Upon reception of $\{C'_1, E_{K1}(S_1)\}$, the client system 400 first extracts the key $K_1$ from $C'_1$ using key extractor 405. The key is passed on to the descrambler 410, and is used to decrypt $E_{K1}(S_1)$. An MP3 decoder 415 sequentially decodes $C_1$ and $S_1$. $C_1$ and $S_1$ may be rendered by an audio renderer 420. The client system 400 may function as a "blackbox." That is, the client may not have access to the digital audio streams $C_1$ nor $S_1$. The client has access to the analog audio coming out of the audio renderer 420.

The present invention can be applied to any digital content. The digital content is preferably capable of embedding temporal synchronization information. For example, the present invention may be applied to MPEG-4 multimedia streams including synchronized text, audio and video objects. Assume, for example, an MPEG-4 stream includes a text object to be displayed at time $t_1$, followed by an audio clip to be rendered at time $t_2$. The text and audio objects may correspond, respectively, to $C_1$ and $S_1$. In this case, the text object hides the key used to encrypt/decrypt the audio object.

The present invention assumes that both the stenographic function and the cryptographic algorithm used to, respectively, hide the key into a media unit and encrypt a following media unit, are not known by an unauthorized person. Cryptographic algorithms are often published, while stenographic systems have their mechanisms kept confidential subject to non-disclosure agreements. Therefore, if the key cannot be extracted, guessing the cryptographic technique does not help in any way.

Cryptographic algorithms may include, for example, Rivest, Shamir and Adelmen (RSA), Data Encryption Algorithm (DEA) and the like. Steganographic techniques preferably provide a hidden key which does not affect the quality of the original signal, for example, the audio quality. Also, the hidden key should be statistically invisible. For example, an unauthorized person should not be able to detect the hidden key by comparing several signals belonging to the same content provider. The hidden key may be made such that it does not survive successive compression operations and/or signal manipulations.

A preferred steganographic technique for MP3-encoded audio exploits the masking properties of the human auditory system. Masking is a phenomenon in which one sound interferes with a persons perception of another sound. Frequency masking occurs when two tones which are close in frequency are played at the same time. Similarly, temporal masking occurs when a low-level signal is played immediately before or after a stronger one. Many stenographic techniques operate in this transform space. Stenographic techniques known in the art may be employed in accordance with the present invention.

Figure 2:
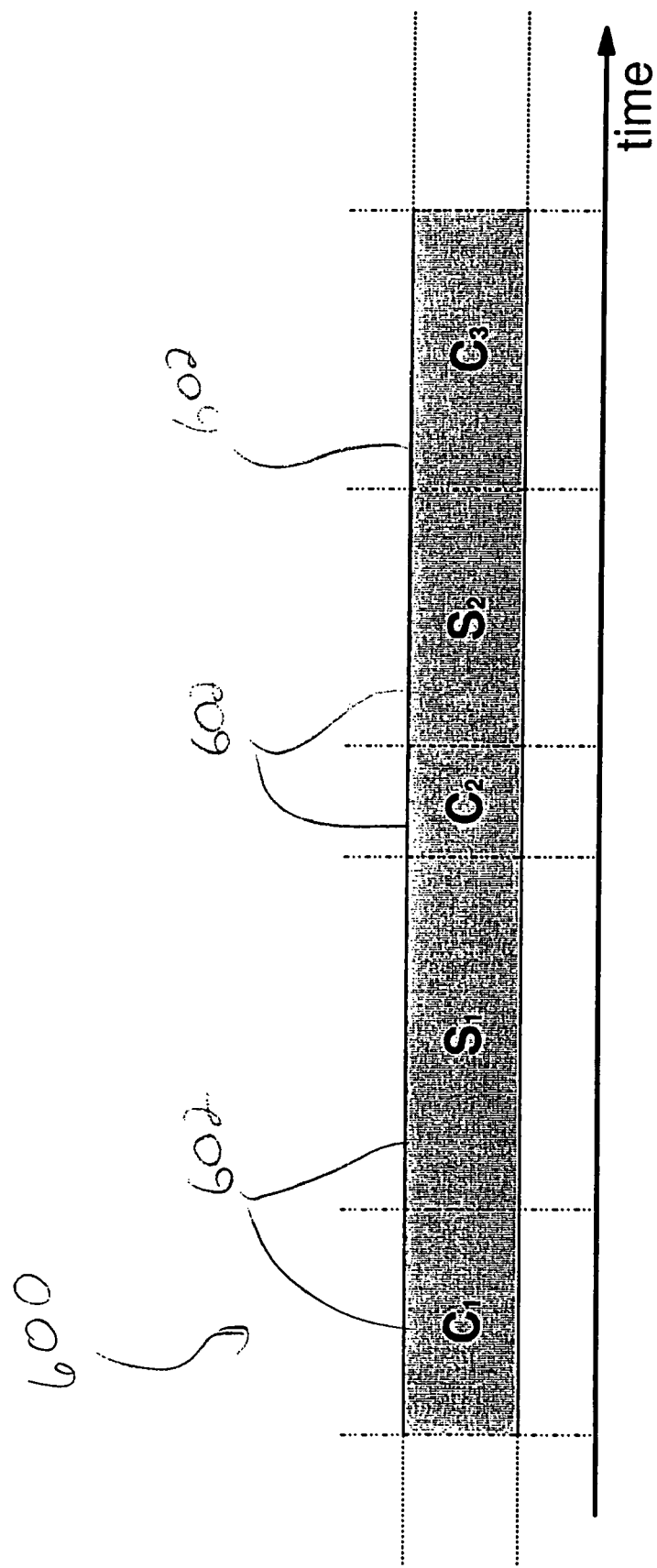
FIG. 2 depicts a digital multimedia stream which is decomposed into units including $\{C_i\}$ and $\{S_i\}$ in accordance with the present invention.

Referring to FIG. 2, the present invention can also assist in preventing, for example, MPEG-2 movie broadcasts from commercial removal. A digital multimedia stream 600 is decomposed into units 602. Units 602 may include two sets of units, namely $\{C_i\}$ and $\{S_i\}$. A given unit $C_j$ is immediately followed by unit $S_j$ and preceded by unit $S_{j-1}$. In this case, $\{C_i\}$ and $\{S_i\}$ correspond respectively to the commercials and the movie clips in between commercials. The commercials represented by $C_1$, $C_2$, and $C_3$ in FIG. 2 are not encrypted and hide a set of keys $\{K_i\}$ used to encrypt/decrypt the movie clips $S_1$ and $S_2$. This information is processed the client system 400 as described with reference to FIG. 1.

Figure 3:
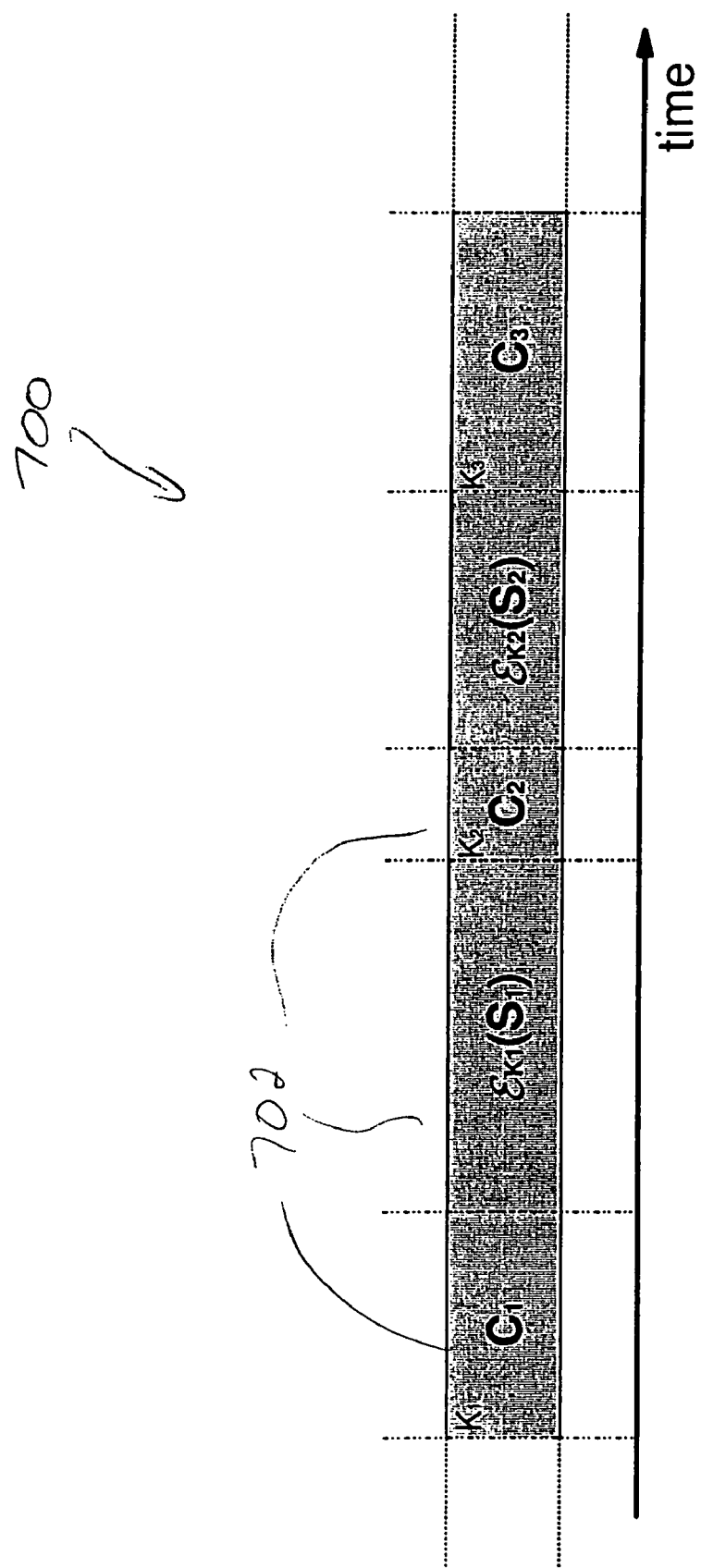
FIG. 3 depicts another embodiment of the present invention showing every unit from set $\{C_i\}$ including a portion of hidden key $K_i$ that is used to encrypt/decrypt every unit from set $\{S_i\}$.

Referring to FIG. 3, another implementation of the present invention is illustratively shown in accordance with the present invention. A digital multimedia stream 700 is decomposed into units 702. Every unit 702 from set $\{C_i\}$ -includes a hidden key $K_i$ that is used to encrypt/decrypt every unit from set $\{S_i\}$. Units $C_i$ are not encrypted. This information is processed the client system 400 as described with reference to FIG. 1.

Figure 4:
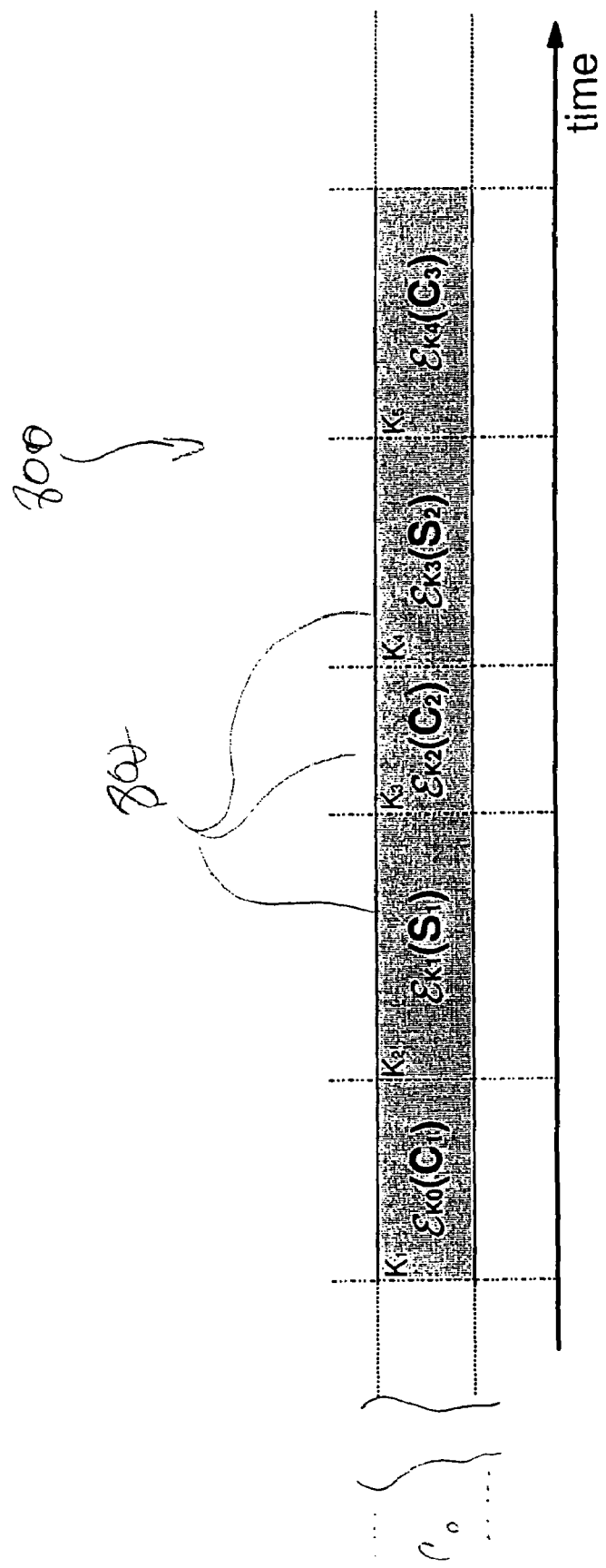
FIG. 4 depicts another embodiment of the present invention showing all units encrypted and hiding a portion of the encryption key.

Referring to FIG. 4, another implementation of the present invention is illustratively shown in accordance with the present invention. A digital multimedia stream 800 is decomposed into units 802. All units 802 are encrypted and hiding a key. A first unit, $C_0$, is not encrypted.

Figure 5:
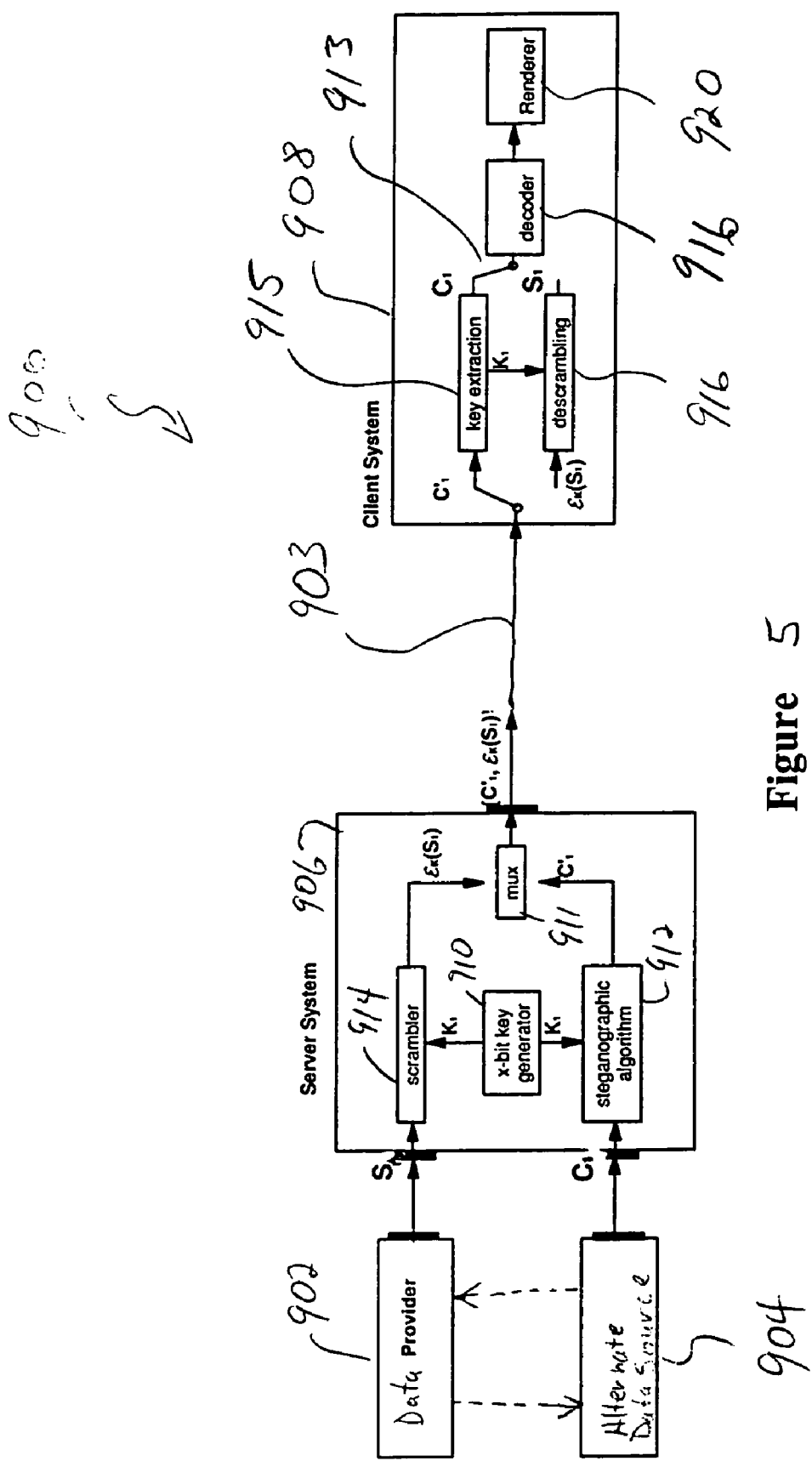
FIG. 5 is a block/flow diagram illustrating a system and method for protecting a digital data stream from unauthorized editing in accordance with the present invention.

Referring to FIG. 5, a digital data distribution system 900 is shown. The system 900 includes a data provider 902, such as, for example, a video provider, a music provider (FIG. 1), text, images or any other data which can be transmitted over a link. An alternate source of data 904 or redundant data from data provider 902 may be employed to alternately place units onto link 903. In this way, data provider represents $C_i$ and alternate source of data 904 or redundant data represents $S_i$ (see, e.g., FIG. 2).

The present invention may be applied on a single media (e.g., a movie or song) that has been broken up into units. The hidden key extraction algorithm should be capable of detecting a key without knowledge of the key's location in the media. Units may be of variable size (e.g., in bytes or in time (seconds)).

A server system 906 is coupled to a client 908 by link 903. Link 903 may include a network, such as a public network (e.g., the Internet) or a cable linking two devices, a wireless connection, a virtual circuit, a software link (or a link realized through a software application) or any other link in which data may be transferred. It is to be understood that multiple clients or servers may be employed in system 900.

The data provider 902 and the alternate data source 904 are shown to illustrate how multiple sources may include data into a data stream; however a single data source, such as a storage medium or a data source may be employed, as well as a plurality of data sources to place multiple data units in a predetermined order on link 903.

In the example, the data provider 902 and the alternate data source 902 provide the server system 906 with, for example, encoded (or encrypted) data units and key carrying data units (which may also be encrypted), respectively. Upon request, the server system 906 provides a client 908 with an editing-proof data stream $\{C'_i, E_{Ki}(S_i)\}$, where $K_i$ is an x-bit key, $S_i$ is data from source 902, $C'_i$ is a container for $K_i$ and $E_{Ki}$ is an encryption function using key $K_i$. The data stream, $\{C'_1, E_{K1}(S_1)\}$, is generated by segmenting the data stream into units.

An x-bit key generator 910 generates a key $K_1$. A steganographic algorithm 912 hides the randomly-generated key $K_1$ into data, $C_1$, provided by alternate data source 904. This generates $C'_1$. Then, a scrambler 914 encrypts, $S_1$, provided by the data source 902 using key $K_1$. This generates $E_{K1}(S_1)$. The server system 906 distributes the digital stream $\{C'_1, E_{K1}(S_1)\}$ resulting from the concatenation of the data from source 904 including the key $K_1$, $C'_1$, and the scrambled digital data from 902, $E_{K1}(S_1)$. This is performed by preferably employing a multiplexor 911.

Upon reception of $\{C'_1, E_{K1}(S_1)\}$, the client system 908 first extracts the key $K_1$ from $C'_1$ by employing a key extractor 915. The key is passed on to a descrambler 916, and is used to decrypt $E_{K1}(S_1)$. A decoder 918 sequentially decodes $C_1$ and $S_1$ using a demultiplexor 913 for example. This reassembles the data stream to provide the original data package. $C_1$ and $S_1$ may be rendered by an renderer 920.

By the present invention, the encryption key $K_1$ is distributed across the transmission. Advantageously, to render the entire document transferred in the data stream, the entire document needs to be received. Any portion removed or added destroyed the encryption link between segments thereby ensuring unauthorized editing does not take place. The renderer 920 may include a video player, a tape player, a computer, a compact disc or DVD player, or any other storage media rendering device.

Having described preferred embodiments of a system and method for stream continuity enforcement (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for enforcing data stream continuity comprising:
   a server coupled to a transmission link for providing a data stream to at least one client over the transmission link, the data stream being segmented into units, the server including:
   a scrambler for encrypting at least one first unit using an encryption key;
   a steganographic unit for embedding the encryption key into at least one second unit for the data stream such that steganographic information is needed by the client to determine the encryption key and decipher the data stream,
   wherein the at least one first unit and the at least one second unit are encrypted and each carries a portion of the encryption key.

2. The system as recited in claim 1, wherein the steganographic unit employs a steganographic masking algorithm.

3. The system as recited in claim 1, wherein the data stream includes a transmission order which alternates between first units and second units.

4. The system as recited in claim 1, wherein the steganographic unit encrypts the at least one second unit.

5. The system as recited in claim 1, wherein the transmission link includes the Internet.

6. The system as recited in claim 1, wherein at least one of the client and the server include a memory storage device.

7. A system for enforcing data stream continuity comprising:
   a client system coupled to a transmission link for receiving a data stream from at least one server over the transmission link, the data stream being segmented into units, the client system including:
   a key extractor for extracting an encryption key steganographically hidden in at least one first unit in the data stream received from the server such that steganographic information is needed by the client to determine the encryption key;
   a descrambler for descrambling at least one second unit which was encrypted in accordance with the encryption key before transmission from the server; and
   a decoder coupled to the key extractor and the descrambler for reassembling the data stream such that all of the units of the data stream are needed to decipher the data stream,
   wherein that at least one first unit and the at least one second unit are encrypted and each carries a portion of the encryption key.

8. The system as recited in claim 7, wherein the data stream includes a transmission order which alternates between first units and second units.

9. The system as recited in claim 7, wherein the encryption key is also steganographically hidden in the at least one second unit.

10. The system as recited in claim 7, wherein the transmission link includes the Internet.

11. The system as recited in claim 7, wherein at least one of the client and the server include a memory storage device.

12. A method for enforcing data stream continuity comprising the steps of:
   providing data to be transmitted over a link;
   segmenting the data into units for a data stream to be transferred over the link;
   scrambling at least one first unit by encrypting the at least one first unit using an encryption key;
   steganographically embedding the encryption key into at least one second unit for the data stream such that steganographic information is needed by a client to determine the encryption key and decipher the data stream;
   extracting the encryption key steganographically embedded in at least one second unit in the data stream;
   descrabling at least one first unit which was encrypted in accordance with the encryption key; and
   reassembling the data stream at the client such that all of the units of the data stream are needed to decipher the data stream,
   wherein the at least one first unit and the at least one second unit are encrypted and each carries a portion of the encryption key.

13. The method recited in claim 12, wherein the data stream includes a transmission order which alternates between first units and second units.

14. The method as recited in claim 12, wherein the step of steganographically embedding includes the step of steganographically embedding portions of the encryption key in the at least one first unit.

15. The method as recited in claim 12, wherein the transmission link includes the Internet.

16. The method as recited in claim 12, wherein at least one of the client and the server include a memory storage device.

17. A method for enforcing data stream continuity comprising the steps of:
   providing data to be transmitted over a link;
   segmenting the data into units for a data stream to be transferred over the link;
   scrambling at least one first unit by encrypting the at least one first unit using an encryption key;
   steganographically embedding the encryption key into at least one second unit for the data stream such that steganographic information is needed by a client to determine the encryption key and decipher the data stream,
   wherein the at least one first unit and the at least one second unit are encrypted and each carries a portion of the encryption key.

18. The method recited in claim 17, wherein the data stream includes a transmission order which alternates between first units and second units.

19. The method as recited in claim 17, wherein the step of steganographically embedding includes the step of steganographically embedding portions of the encryption key in the at least one first unit.

20. The method as recited in claim 17, wherein the transmission link includes the Internet.

21. The method as recited in claim 17, wherein at least one of the client and the server include a memory storage device.

22. A method for enforcing data stream continuity comprising the steps of:

providing data segmented into units for a data stream transferred over a link, the units including at least one first unit and at least one second unit;

extracting an encryption key steganographically embedded in at least one second unit in the data stream;

descrabling the at least one first unit which was encrypted in accordance with the encryption key; and reassembling the data stream at the client such that all of the units of the data stream are needed to decipher the data stream, wherein the at least one first unit and the at least one second unit are encrypted and each carries a portion of the encryption key.

23. The method recited in claim 22, wherein the data stream includes a transmission order which alternates between first units and second units.

24. The method as recited in claim 22 wherein the portions of the encryption key are embedded in the at least one first unit.

25. The method as recited in claim 22, wherein the link includes the Internet.

26. The method as recited in claim 22, wherein at least one of the client and the server include a memory storage device.

27. A program storage device readable by machine, tangibly embodying a program of instructions executable by the machine to perform methods steps for enforcing data stream continuity, the methods steps comprising:

segmenting data to be transmitted over a link into units for a data stream to be transferred over a link;

scrambling at least one first unit for the data stream before transmission by encrypting the at least one first unit using an encryption key;

steganographically embedding the encryption key into at least one second unit for the data stream such that steganographic information is needed by a client to determine the encryption key and decipher the data stream;

extracting the encryption key steganographically embedded in at least one second unit in the data stream;

descrabling at least one first unit which was encrypted in accordance with the encryption key; and reassembling the data stream at the client such that all of the units of the data stream are needed to decipher the data stream, wherein the at least one first unit and the at least one second unit are encrypted and each carries a portion of the encryption key.

28. A program storage device readable by machine, tangibly embodying a program of instructions executable by the machine to perform methods steps for enforcing data stream continuity, the methods steps comprising:

providing data to be transmitted over a link;

segmenting the data into units for a data stream to be transferred over the link;

scrambling at least one first unit by encrypting the at least one first unit using an encryption key; and steganographically embedding the encryption key into at least one second unit for the data stream such that steganographic information is needed by a client to determine the encryption key and decipher the data stream, wherein the at least one first unit and the at least one second unit are encrypted and each carries a portion of the encryption key.

29. A program storage device readable by machine, tangibly embodying a program of instructions executable by the machine to perform methods steps for enforcing data stream continuity, the methods steps comprising:

providing data segmented into units for a data stream transferred over a link, the units including at least one first unit and at least one second unit;

extracting an encryption key steganographically embedded in at least one second unit in the data stream;

descrabling the at least one first unit which was encrypted in accordance with the encryption key; and reassembling the data stream at the client such that all of the units of the data stream are needed to decipher the data stream, wherein the at least one first unit and the at least one second unit are encrypted and each carries a portion of the encryption key.

* * * * *